(12) United States Patent
Nandakumar et al.

(10) Patent No.: US 11,700,376 B1
(45) Date of Patent: Jul. 11, 2023

(54) OPTIMIZING AND ASSIGNING VIDEO ENCODING LADDERS

(71) Applicant: Amazon Technologies, Inc., Seattle, WA (US)

(72) Inventors: Deepthi Nandakumar, Bengaluru (IN); Vishal Jain, Rohtak (IN); Sriram Sethuraman, Bangalore (IN); Sandesh Ghanta, Visakhapatnam (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/449,183

(22) Filed: Sep. 28, 2021

(51) Int. Cl.
*H04N 19/132* (2014.01)
*H04N 19/146* (2014.01)
*H04N 19/154* (2014.01)
*G06N 20/00* (2019.01)
*H04N 19/179* (2014.01)
*G06F 18/23* (2023.01)
*G06F 18/20* (2023.01)

(52) U.S. Cl.
CPC ........... *H04N 19/132* (2014.11); *G06F 18/23* (2023.01); *G06F 18/285* (2023.01); *G06N 20/00* (2019.01); *H04N 19/146* (2014.11); *H04N 19/154* (2014.11); *H04N 19/179* (2014.11)

(58) Field of Classification Search
CPC .. H04N 19/132; H04N 19/146; H04N 19/154; H04N 19/179; G06K 9/6218; G06K 9/6227; G06N 20/00
See application file for complete search history.

(56) References Cited

U.S. PATENT DOCUMENTS

| | | | |
|---|---|---|---|
| 9,179,159 B2 | 11/2015 | Good | |
| 10,419,773 B1 * | 9/2019 | Wei | ............... H04N 19/46 |
| 10,666,992 B2 | 5/2020 | Katsavounidis | |
| 10,721,475 B2 | 7/2020 | Sethuraman et al. | |
| 11,019,374 B2 | 5/2021 | Wallendael et al. | |
| 11,025,914 B1 | 6/2021 | Yuen et al. | |
| 11,184,638 B1 * | 11/2021 | Sipitca | ............... H04N 19/179 |
| 11,277,620 B1 | 3/2022 | Liu et al. | |
| 11,343,492 B2 | 5/2022 | Chadwick et al. | |
| 11,503,302 B2 | 11/2022 | Pandit et al. | |
| 2009/0310673 A1 | 12/2009 | Chung | |
| 2012/0206476 A1 | 8/2012 | Woolfe et al. | |
| 2015/0036740 A1 | 2/2015 | Yang et al. | |
| 2016/0007050 A1 | 1/2016 | Rusert et al. | |
| 2016/0037176 A1 | 2/2016 | Chari | |
| 2016/0295216 A1 | 10/2016 | Aaron et al. | |
| 2017/0085929 A1 | 3/2017 | Arpteg | |
| 2018/0242015 A1 | 8/2018 | Katsavounidis | |
| 2018/0343458 A1 * | 11/2018 | Katsavounidis | ..... H04N 19/142 |
| 2019/0028745 A1 | 1/2019 | Katsavounidis | |
| 2019/0289296 A1 | 9/2019 | Kottke et al. | |
| 2021/0144377 A1 | 5/2021 | Lei et al. | |

(Continued)

OTHER PUBLICATIONS

Datanovia: "Cluster Validation Statistics: Must Know Methods" https://www.datanovia.com/en/lessons/cluster-validation-statistics-must-know-methods/ [retrieved on Sep. 28, 2021].

(Continued)

*Primary Examiner* — Tracy Y. Li (74) *Attorney, Agent, or Firm* — Weaver Austin Villeneuve & Sampson LLP (57) ABSTRACT

Techniques are described for optimizing and assigning video encoding ladders.

20 Claims, 5 Drawing Sheets

(56) References Cited

U.S. PATENT DOCUMENTS

2021/0160512 A1   5/2021  Liu et al.
2021/0297739 A1   9/2021  Manus et al.

OTHER PUBLICATIONS

Wikipedia: "Dunn index" https://en.wikipedia.org/wiki/Dunn_index [retrieved on Sep. 28, 2021].
Wikipedia: "k-means++" https://en.wikipedia.org/wiki/K-means%2B%2B [retrieved on Sep. 28, 2021].
Wikipedia: "k-medoids" https://en.wikipedia.org/wiki/K-medoids [retrieved on Sep. 28, 2021].
Wikipedia: "Lloyd's algorithm: Different distances" https://en.wikipedia.org/wiki/Lloyd%27s_algorithm#Different_distances [retrieved on Sep. 28, 2021].
U.S. Appl. No. 17/248,544, filed Jan. 28, 2021, Jain et al.
U.S Non-Final Office Action dated Jun. 10, 2022, in U.S. Appl. No. 17/248,544.
U.S. Final Office Action dated Nov. 28, 2022 in U.S. Appl. No. 17/248,544.

\* cited by examiner

"OPTIMIZING AND ASSIGNING VIDEO ENCODING LADDERS"

BACKGROUND

Streaming video services encode source content into various representations corresponding to different combinations of resolution and bitrate. These various representations allow the streaming video service to tailor video streams to a customer's playback device capability and bandwidth availability. On the client side, software running on the playback device adaptively switches between representations according to algorithms that manage the video quality and playback experience. For a streaming video service with a large media content catalog having diverse content characteristics, determining an appropriate set of representations (i.e., an encoding ladder) for each video title remains a challenge.

DETAILED DESCRIPTION

This disclosure describes systems and techniques for determining the best encoding ladders for different subsets of a diverse set of video samples (e.g., clips, shots, scenes, titles, etc.), and assigning new unclassified video samples to each encoding ladder. According to a particular class of implementations, a large dataset of video samples is clustered into different subsets based, for example, on the optimal convex hull for each sample (i.e., the encoding ladder that delivers the maximum quality and the lowest bitrate for that sample). A representative encoding ladder is then selected for each cluster (e.g., the centroid of the cluster). A feature set is generated for each video sample and used to train a classification model to assign new video samples to the appropriate cluster and its corresponding encoding ladder. The feature set may include encoding features (e.g., generated in a single-pass encoding) and/or spatio-temporal features (e.g., generated through video analysis). The systems and techniques enabled by the present disclosure allow for the prediction of a complete encoding ladder for a given input video sample based on its feature set. An example will be instructive.

Figure 1:
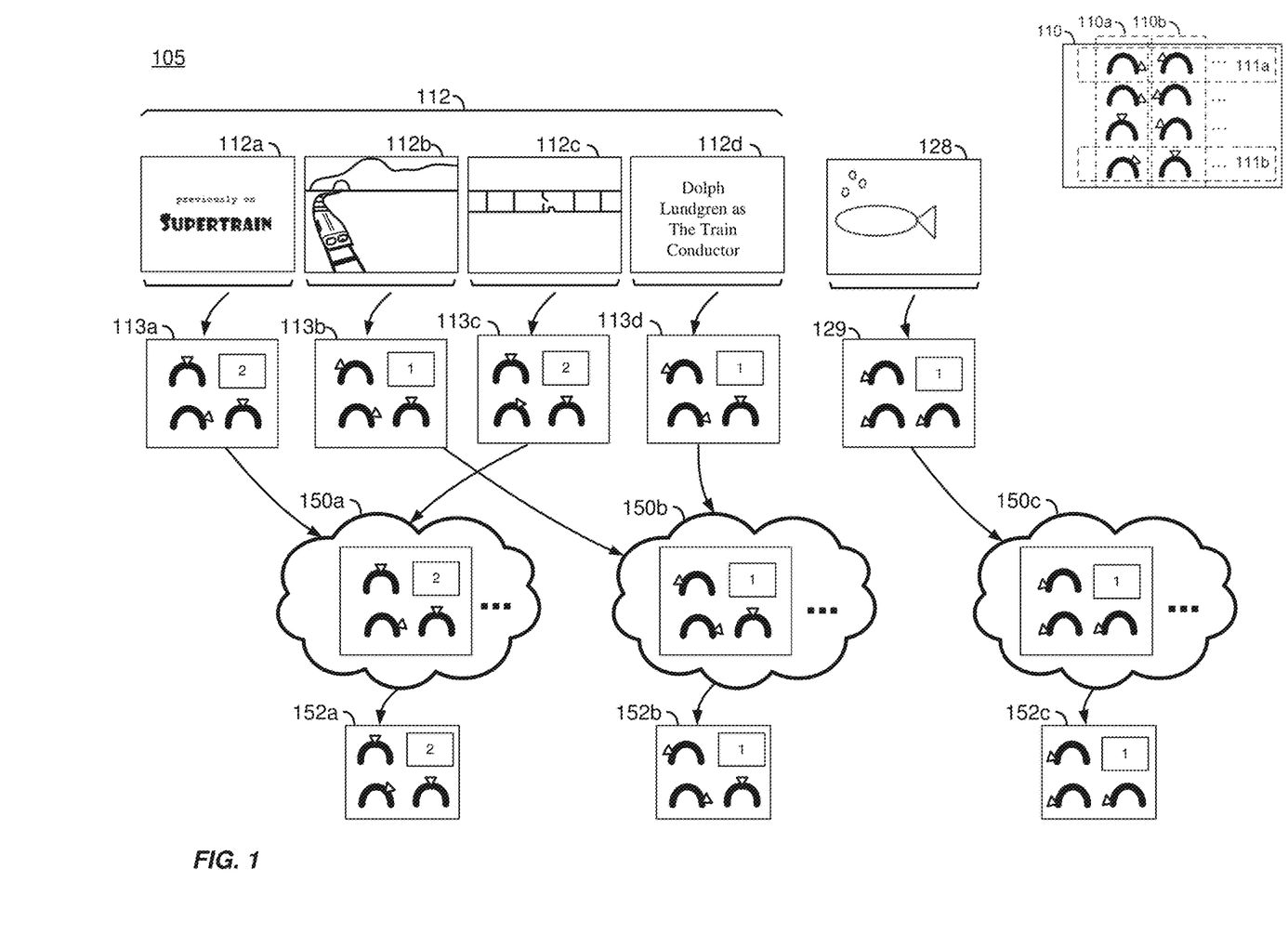
FIG. 1 illustrates an example of optimizing encoding profiles.

FIG. 1 illustrates an example of encoding media content with optimized encoding ladders (i.e., sets of encoding profiles tailored to the characteristics of the media content being encoded). In FIG. 1, media content 105 includes video presentation 112, which includes clips 112a-112d, and includes clip 128, with at least two of the clips having different characteristics. As examples, video presentation 110 may be a live-action movie including a recap clip 112a, an action clip 112b, a close-up clip 112c, and an end credits clip 112d; and clip 128 may be a clip from an animated video.

FIG. 1 depicts default encoding ladder 110 with four "rungs," each rung corresponding to a particular encoding profile (i.e., a particular set of encoding parameter values for, among other things, resolution and bitrate). Encoding ladders allow delivery of a range of viewing experiences to users connecting with different devices over varying bandwidths, with "higher rungs" generally corresponding to higher bandwidth consumption, higher resolutions, and/or higher visual qualities. A particular encoding ladder is configured to make tradeoffs between resources consumed during the encoding/decoding process (e.g., processing time, bandwidth, storage, etc.) and visual quality.

In FIG. 1, each encoding profile in encoding ladder 110 (e.g., profiles 111a and 111b) includes an encoding parameter 110a. Encoding parameter 110a corresponds to image resolution, and can take on the four values of UHD, 1080p, 720p, and 576, with each encoding profile in default encoding ladder 110 corresponding to a different image resolution value. FIG. 1 also depicts that each encoding profile in ladder 110 has an encoding parameter 110b. Encoding parameter 110b corresponds to a quantization parameter, which represents a factor applied to residual coefficients that indicate differences in image content between different portions, or coding units, of an image frame to scale down the residual coefficients as a compression technique. Encoding parameter 110b can take values in a range of values, such as, for example, from 0-51. In FIG. 1, encoding profile 111a (corresponding to the UHD resolution) has a low quantization parameter value that results in less compression and higher quality, and encoding profile 111b (corresponding to the 576i resolution) has a high quantization parameter value that results in more compression and lower quality.

In some scenarios, default encoding ladder 110 corresponds to an encoding ladder that is applied to media content 105 irrespective of the characteristics of media content 105 (e.g., what kind of event the media is and the typical encoding complexity of that kind of event). That is, default encoding ladder 110 is applied to video clips 112a-d, 128, and other video presentations in media content 105, resulting in each of the video presentations in media content 105 being encoded as multiple representations corresponding to each of the encoding profiles in default encoding ladder 110.

However, a default encoding ladder may not be well-suited for all content. For example, a particular value for an encoding parameter setting such as the quantization parameter may provide a high-quality encoding of content of a first category (e.g., concerts having relatively little motion). However, content of a second category (e.g., sports events having a relatively higher degree of motion) might not be encoded as well since the parameter settings for high quality encodings vary based on the characteristics of the content, including, but not limited to, levels of motion, spatial details, and encoding complexity. As another example, the default encoding ladder may be well-suited for providing a high-quality encoding of live-action content, but animated content might not be encoded as well since the encoder parameter settings for animated content may vary from live-action content. Therefore, if the default encoding ladder is tailored to a first category or type of content, other categories or types of content may be encoded with sub-optimal quality range or quality spacing and/or result in excessive bitrates.

In FIG. 1, rather than using default encoding ladder 110, a plurality of optimized encoding ladders can be determined based on trial encodings of media content 105. FIG. 1 illustrates an individual rung of the optimized encoding ladder of for each trial-encoded clip. In particular, FIG. 1 illustrates rung 113a of an optimized encoding ladder for clip 112a, rung 113b of an optimized encoding ladder for clip 112b, rung 113c of an optimized encoding ladder for clip 112c, rung 113d of an optimized encoding ladder for clip 112d, and rung 129 of an optimized encoding ladder for clip 128. In the example of FIG. 1, the rungs illustrate encoding parameters that can be adjusted in continuous or discrete steps, as well as an encoding parameter that's configurable between a limited number of discrete settings. As an example of such a parameter, an AQ-mode parameter may have a setting of 1, 2, or 3.

Examples of how to determine an optimized encoding ladder for a given clip are described by Hai Wei et al., U.S. Pat. No. 10,616,590, the entire disclosure of which is incorporated herein by reference in its entirety and for all purposes.

It may be desirable to cluster together "similar" encoding ladders from the plurality of clip-level-optimized encoding ladders, as shown in clusters 150a-150c of FIG. 1. By clustering together "similar" encoding ladders, the number of distinct encoding ladders can be reduced. Each clip may also be assigned to a cluster based on a similarity measurement relative to the centroids of the available clusters. A clip that is assigned to a particular cluster may be encoded with that cluster's centroid (e.g., the encoding ladder optimized for that cluster). Cluster 150a may have an associated cluster-optimized encoding ladder including rung 152a, cluster 150b may have an associated cluster-optimized encoding ladder including rung 152b, and cluster 150c may have an associated cluster-optimized encoding ladder including rung 152c.

A clip that is encoded with its cluster's centroid will be sub-optimally encoded relative to the theoretically best possible encoding of that clip. In particular, the curve of highest possible image quality as a function of bitrate (hereinafter RQ-curve) will be lower when a clip is encoded with its cluster's centroid as opposed to an encoding ladder optimizing specifically for that clip. It would therefore be desirable to reduce or minimize the differences in RQ-curves, by appropriately selecting clusters centroids and assigning clips to clusters in a manner that reduces the total differences in RQ-curves. In other words, it may be desirable for the centroid in a particular cluster to be the encoding ladder where the total "distance" or "dissimilarity" between the RQ-curves using that encoding ladder and the RQ-curves for clip-optimized encoding ladders. In this context, "distance" or "dissimilarity" may be defined using equation (1).

$$D(c,p)=(A(c,p^c)-A(c,p))/A(c,p^c) \quad (1)$$

Figure 4:
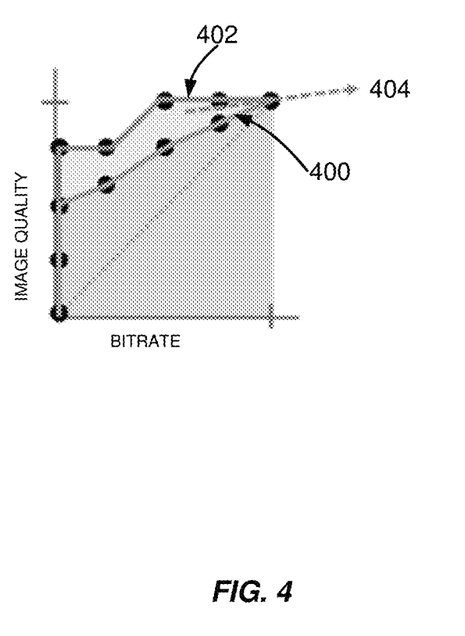
FIG. 4 is a graph of image quality versus bitrate.

In equation (1), $p^c$ refers to the optimal parameter-hull (e.g., optimal encoding ladder) for the shot c, A(c,p) refers to the area under the piece-wise RQ curve when clip c is encoded with parameter-hull p. An example shown in FIG. 4, where curve 402 is the RQ curve generated by the optimal parameter set for clip c and curve 400 is the RQ curve generated by a candidate parameter set for a cluster's centroid. The difference is areas under curve 400 and 402 (e.g., area 404) can be used to measure of how sub-optimal the candidate parameter set for the cluster's centroid is relative to the optimal parameters for the particular clip c.

As part of clustering together "similar" encoding ladders, a set of initial clusters may be initialized. Any desired strategy for initializing clusters may be utilized. As an example, when it is desired to form k clusters, k encoding ladders may be randomly or pseudo-randomly selected as k centroids of respective k clusters. As another examples, a k-means++algorithm may be used for selecting the initial clusters.

After initializing clusters, the remaining encoding ladders may be then assigned to their "nearest" cluster (e.g., according to equation (1) or some similar measure of distance or similarity). After initialization, it may be desirable to change which encoding ladder within each cluster is designated as the centroid. In particular, it may be desirable to select, as centroid encoding ladder for each cluster, whichever encoding ladder minimizes the sum of "distances" for all encoding ladders within that cluster, according to equation (1) or some similar measure of distance of similarity. In particular, it may be desirable for the centroid encoding ladder to result in the lowest sum of distances, where the sum includes the distance between the candidate centroid encoding ladder and the clip-optimal encoding ladder, across some or all of the clips in the cluster.

In some cases, altering the centroid encoding ladder can change the assignments of encoding ladders to certain clusters. As an example, a given sample may be initially "closer" to the centroid of cluster A, but after updating the centroids of cluster A and/or cluster B, the same sample may be "closer" to the centroid of cluster B. Thus, it may be desirable to re-assign samples to clusters after selecting one or more new centroid encoding ladders for one or more respective clusters. The process of assignment and centroid updating may be repeated as long as desired. As an example, the process of assignment and centroid updating may be performed until a predetermined maximum number of iterations is reached.

In some implementations, the quality of clustering may be evaluated, e.g., to determine if any clusters need to be merged and/or split. As an example, a "Dunn index" may be calculated that reflects separability inside clusters and between clusters (e.g., evaluating the compactness and separation of the clusters).The "Dunn index" may be a ratio of the minimum of inter-cluster distances and maximum of intra-cluster distances. When the "Dunn index" is relatively small, it may be a sign that one or more clusters is too large and should be split. Conversely, when the "Dunn index" is relatively large, it may be a sign that one or more clusters should be merged.

One benefit of this approach is that the centroid is always a real parameter set from a video within the cluster. In contrast, other techniques for clustering encoding ladders may take the mean and/or median of encoding parameters within the cluster, and thus represent a theoretical parameter set, which in some cases may not even be practically usable. Nonetheless, other techniques for clustering encoding ladders, including those using means and/or medians, may be used.

In some implementations, the number of clusters may vary with desired quality level and bitrate, as fewer clusters may be needed at relatively low quality levels and bitrates. As a particular example, certain differences between shots such as the presence of film-grain may disappear at relatively low quality levels (where such film-grain would generally not be preserved). Thus, while it may be beneficial to have a separate clusters specialized for film-grain shots and non-film-grain shots at high quality levels, it may be preferable to have a single cluster for both film-grain and non-film grain shots at lower quality levels.

The centroid encoding ladders, such as the ladders including rungs 152a, 152b, and 152c, may then be used to encode media content 105, where each shot is assigned to and encoded by a particular cluster and centroid encoding ladder. Additional information regarding techniques for determining cluster-optimized encoding ladders may be found in U.S. patent application Ser. No. 17/248,544 for Optimizing Streaming Video Encoding Profiles filed Jan. 28, 2021, the entire disclosure of which is incorporated herein by reference for all purposes.

According to a particular class of implementations, a machine learning approach is taken to select an encoding ladder for a new video sample that has not been assigned to a cluster. Feature sets representing the video samples assigned to the clusters are used as a training dataset to train a classifier to classify new video samples as belonging to one of the clusters based on similarly generated feature sets for the new samples. As will be described, the feature sets may include encoding features generated with a single-pass encoding and/or spatio-temporal features generated through analysis of the video samples. The encoding ladder for the cluster to which a new sample is assigned may then be used to encode that sample and potentially a larger media presentation (e.g., video title) of which that sample is a part.

Figure 2:
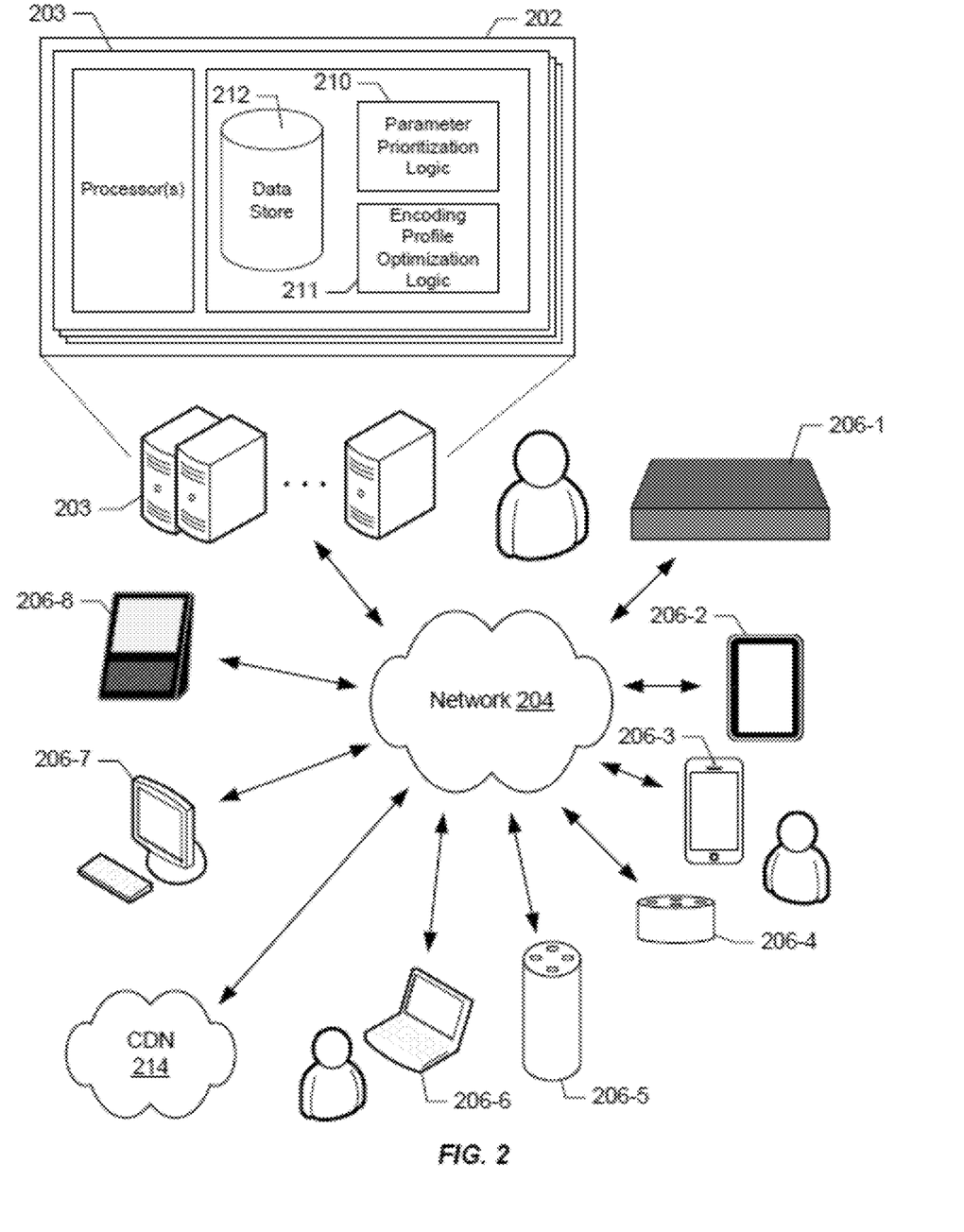
FIG. 2 illustrates an example of a computing environment for optimizing encoding profiles.

FIG. 2 illustrates an example of a computing environment in which encoding profiles may be optimized via clustering, as discussed with reference FIG. 1, and new video samples may be assigned to and encoded with cluster-optimized encoding ladders in accordance with the techniques described herein. Service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and generating and/or consuming content streams. Such devices may include, for example, mobile devices (e.g., cell phones, smart phones, tablets, and the like), personal computers (e.g., laptops and desktops), set top boxes (e.g., for cable, satellite, and online systems), smart televisions, gaming consoles, wearable computing devices (e.g., smart watches or smart glasses), internet-connected cameras, voice-activated smart home devices (e.g., with integrated personal digital assistants), etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling service 202. Alternatively, such resources may be independent of service 202, e.g., on a platform under control of a separate provider of services and/or computing resources with which service 202 connects to consume resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

It should also be noted that implementations are contemplated in which, in addition to encoding parameter prioritization logic 210, encoding profile optimization logic 211, and encoding ladder assignment logic, service 202 may include other types of logic (not shown) involved in the delivery of content as part of a video-on-demand service or a live/broadcast video service.

In addition to encoding video content according to cluster-optimized encoding ladders and providing access to video streams, service 202 may also include a variety of information related to the video content (e.g., other associated metadata and manifests in data store 212 which service 202 uses, or to which service 202 provides access). Data store 212 may also include data representing cost functions, constraints, historical information, machine learning models, and encoding profiles implemented and generated as described herein. Alternatively, any of this information may be provided and/or hosted by one or more separate platforms, e.g., content delivery network (CDN) 214 or other third-party platform. It should be noted that, while logic 210, 211, and 213 and data store 212 are shown as integrated with service 202, implementations are contemplated in which some or all of these operate remotely from the associated service, and/or are under the control of an independent entity. Those of skill in the art will understand the diversity of use cases to which the techniques described herein are applicable.

Figure 3:
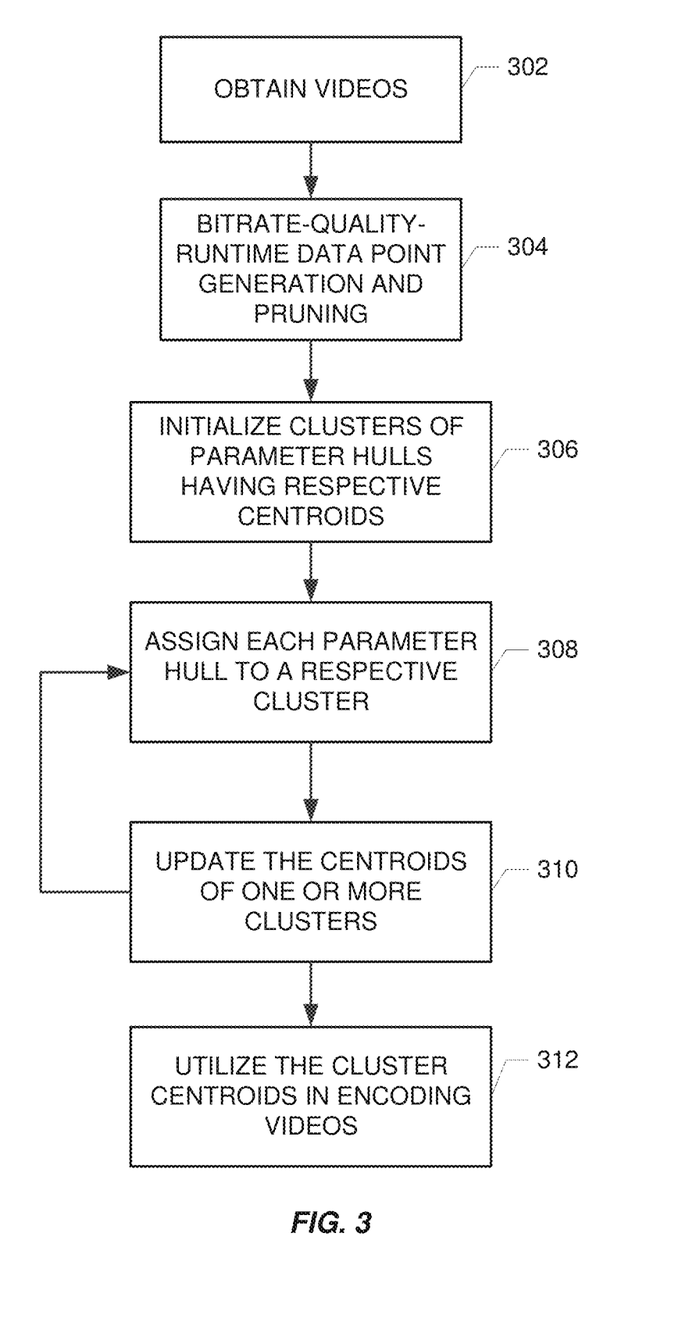
FIG. 3 is a flowchart illustrating processes for optimizing encoding profiles.

FIG. 3 illustrates a flowchart for generating cluster-optimized encoding ladders.

In a class of implementations, generating cluster-optimized encoding ladders includes obtaining videos (302), for performing trial encodes to generate points for a data space. Referring to FIG. 1, media content 105 contains multiple video presentations and multiple shots. For clarity purposes, FIG. 1 depicts five (5) shots or clips, though it should be appreciated that media content 105 contains more than the five (5) depicted shots.

In a class of implementations, generating cluster-optimized encoding ladders includes data point generation and pruning (304) for a multidimensional data space. Examples of dimensions of the data space include any combination of bitrate, quality, encoding runtime, network bandwidth, playback device limitations, end-user distribution and geographic constraints, etc. It should be appreciated that the dimensions of the data space may correspond to system constraints for the design of a video streaming service. In some implementations, data point generation and pruning (304) includes identifying shot-optimized encoding ladders.

For example, the quality level for video played back to a customer of a video streaming service is a design constraint, therefore data point generation (304) uses a data space including a video quality level dimension. In certain implementations, the quality level corresponds to a quality metric algorithm that compares the compressed video with a reference source and outputs a value that predicts how viewers would rate the quality of the compressed video. A person having ordinary skill in the art would recognize that the disclosed techniques are compatible with a wide range of quality metric algorithms, including the Peak Signal-to-noise Ratio (PSNR), Structural Similarity Index (SSIM), Video Multimethod Assessment Fusion (VMAF), etc.

In certain implementations, the data space may also include a dimension for bitrate, such as kilobits per second (kbps). Such a dimension is indicative of the network bandwidth required for transmission of a segment of media content from a content delivery network edge server to a viewer device, and is also indicative of the viewer device content buffer requirements during playback of the downloaded segment of media content at the viewer device.

It should be appreciated that the data space may include dimensions that do not correspond to content playback characteristics. For example, one dimension in data space 175 may be encoding runtime, such as the amount of time to encode all of the frames in a particular video sample or title. Such an attribute relates to the encoding process, rather than relating to decoding or playback at a viewer device.

Pruning of the data space may be performed based on one or more constraints. As previously described, examples of dimensions of the data space include any combination of bitrate, quality, encoding runtime, etc. Pruning of the points can be applied to particular dimensions of the data space. For example, pruning can be applied to ensure a minimum quality level by filtering out data points with a quality level below a threshold.

In a class of implementations, generating cluster-optimized encoding ladders includes initializing a plurality of clusters of parameter hulls having respective centroids (306). As previously described, initializing a plurality of clusters may involve randomly or pseudo-randomly selecting a plurality of shot-optimized encoding ladders as initial centroids. As another example, a k-means++algorithm may be used for selecting the initial centroids from amongst the shot-optimized encoding ladders (generated in 304).

In a class of implementations, generating cluster-optimized encoding ladders includes assigning each parameter hull (e.g., each shot) to a respective cluster (308). As previously described, each parameter hull (e.g., each shot) can be assigned to whichever cluster has a centroid that is "closest" to that parameter hull. As a particular example, equation 1 can be used to determine the "distances" between a given parameter hull and each respective cluster's centroid parameter hull and the given parameter hull can then be assigned to whichever cluster's centroid parameter hull is "closest."

In a class of implementations, generating cluster-optimized encoding ladders includes updating the centroids of one or more clusters (310). As previously discussed, it may be desirable for each cluster's centroid to be the parameter hull that minimizes the total distance relative to the other parameter hulls with that cluster. The optimal centroid for a given cluster under this measure may also change as parameter hulls are assigned to or removed from the cluster. Additionally, as the centroid(s) of one or more clusters are updated, one or more parameter hulls may need to be switched from assignment within a first cluster to assignment within a second cluster. Thus, it may be desirable to iterate blocks 308 and 310 (as illustrated in FIG. 3), until desired. As an example, it may be desirable to iterate blocks 308 and 310 until a predetermined number of iterations has been performed.

In a class of implementations, the cluster centroids may be utilized in encoding videos for distribution (312). As an example, shots within media content 105 may be assigned to a cluster based on the distances between their optimal parameter hull and the various cluster centroids and then encoded with the centroid (e.g., cluster-optimized encoding ladder) for their assigned cluster.

It should be appreciated that video samples as referred to herein may be entire video presentations (e.g., an entire movie or sportscast), groups of video presentations, or may be shorter segments within a presentation, e.g., 2-60 second segments including one or more 2-10 second fragments or "groups of pictures" (GOPs). Additionally, it should be appreciated that the video samples as referred to herein may be in a variety of formats and resolutions and may include standard dynamic range (SDR) and high dynamic range (HDR) video content, as well as standard definition (SD) and high definition (HD) video content.

The techniques described above result in a set of encoding ladders that may be employed efficiently and effectively to encode a large and diverse set of video samples. However, as will be understood, determining an optimal encoding ladder for every video sample in a large and constantly growing library may be too computationally intensive an approach to assigning video samples to existing clusters and their corresponding cluster-optimized encoding ladder. Therefore, according to a class of implementations, a machine learning approach is employed in which the video samples of each cluster are used as training data to train a classifier to associate new video samples with each cluster. This class of implementations is able to predict, based on the feature set for a given video sample, an entire encoding ladder and, for each rung of that ladder, a set of encoding parameters including, for example, the peak bitrate, resolution, buffer size, quality level, quantization parameters, etc.

Figure 5:
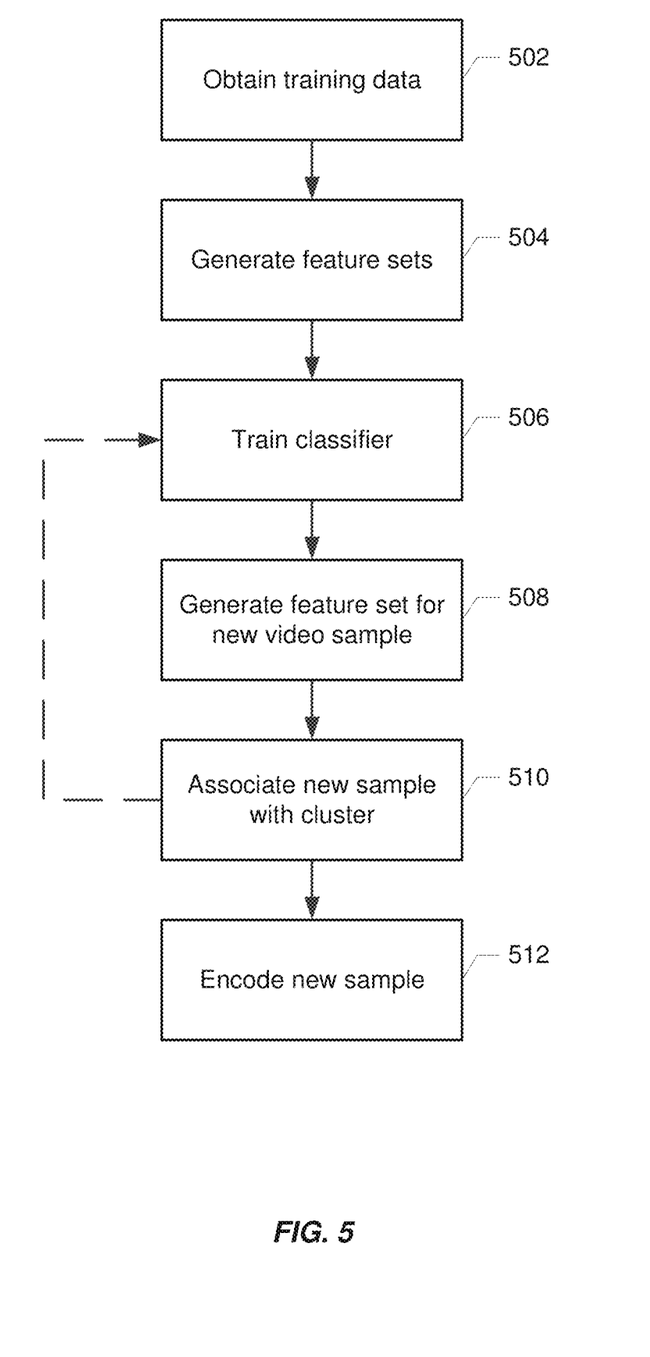
FIG. 5 is a flowchart illustrating training and use of a classifier.

FIG. 5 is a flowchart illustrating operation of a particular implementation. It should be noted that, while the depicted implementation assumes cluster formation as described above, implementations in which clusters of parameter hulls, encoding ladders, and/or video samples are formed differently. The scope of this disclosure with respect to the implementation described below should therefore not be limited with reference to a specific cluster formation technique.

A set of video samples is selected as training data (502). According to a particular implementation, the training video samples are associated with clusters of corresponding parameter hulls or sample-optimized encoding ladders as described above. Each of the clusters has a corresponding cluster-optimized encoding ladder which may be, for example, the centroid of the cluster.

The training video samples may be a representative sample of a larger set of video samples. For example, in a particular implementation, the samples in the training data set are taken from 1,200 one-minute clips from a large catalog of video titles and are representative of the videos in the catalog, for example, covering a variety of genres and characteristics, e.g., animation, drama, film-grain, camera noise, etc. Each of the clips is partitioned into multiple video samples, each video sample corresponding, for example, to a single fragment, group-of-pictures (GOP), scene shot (e.g., a sequence of frames between two instantaneous decoder refresh (IDR) frames), or other suitable subset of the clip. It is the parameter hulls for these video samples by which the video samples are associated with a cluster. That is, each sample is associated with a cluster based on some similarity or distance-measure with respect to a cluster-centroid. One approach to doing this is described above.

In some cases, the distribution of video samples over clusters may be imbalanced which may, in turn, negatively affect classification accuracy, model performance, and/or the training process. Where this is this case, minority samples (video samples associated with clusters below some configurable threshold) may be associated with the next best cluster to reduce the number and improve the balance of the clusters. Other techniques may also be employed to improve the balance of the clusters including, for example, random oversampling, or Synthetic generation of Minority classes (SMOTE).

Some video samples may resemble others in the low quality region (e.g., standard definition or SD), and differentiate themselves in the high quality region (e.g., high definition or HD), or vice versa. Therefore, according to some implementations, the full convex hull for each sample is divided into SD and HD, the clusters are formed separately for each group.

Once formed, the clusters of training video samples provide a ground truth of the video samples and cluster labels with which a classifier is built and trained that ingests each video sample as input and classifies that sample into its corresponding cluster.

A set of features is generated for each video sample (504). The feature set may include statistical features generated from the sample's video-frame sequence. Such statistics may relate, for example, to the spatial and/or temporal complexity of the video frames, chrominance information, contrast statistics, noise, dynamic range of luma, color gamut range, etc. Statistical features may be generated with a single-pass encode (e.g., at 720p) or using the "mezzanine" video, e.g., the source video that is input to the encoder.

The feature set may include encoding features which may also generated based on a single-pass encoding (e.g., from the encoding logs) which may be the same encode used to generate the statistical features. Encoding features may include or relate to parameters such as, for example, I-frame sizes, P-frame sizes, bits used per frame, frame distortions, number of intra coded blocks, average quantization parameter, motion extent, prediction residual statistics, weighted combinations of bits and distortion,, etc.

Depending on the implementation, a variety of different techniques may be employed to achieve dimensionality reduction, i.e., reduction in the number of features in the feature set. According to specific implementations, the SelectKBest and ExtraTrees techniques were shown to achieve stable feature selection/importance.

A classifier is trained to associate the video samples with the clusters using the feature sets (506). Depending on the implementation, a variety of different classifiers types and neural network models may be employed including, for example, tree-based ensemble classifiers (e.g., RandomForest, GradientBoost, and XGBoost), support vector machines, Gaussian process classifiers, and neural network models such as the LSTM, 3D-CNN and LSTM-CNN models, and k-nearest-neighbors (kNN) models. Once trained, the classifier may be used to associate new video samples with the clusters. According to some implementations, joint performance of clustering and classification modules, across encoding-efficiency measures such as, for example, BD-Rate and BD-Quality, is used to obtain the optimal number of encoding ladders.

When such a new video sample is received as input, a feature set for the new video sample is generated (508) in a manner similar to the generation of feature sets for the training video samples. The video sample is then associated with one of the clusters based on its feature set (510). The video sample may then be encoded using the cluster encoding ladder associated with the cluster to which it has been assigned (512). As will be appreciated, as each new video sample is associated with a cluster, the training of the cluster may continue to be updated as indicated by the dashed arrow.

If a new video sample is one of a set of new samples included in a media presentation, it is possible, even likely, that the video samples of the media presentation may be assigned to different clusters. In such cases, the encoding ladder for the media presentation may be selected from among the cluster encoding ladders for the different clusters based, for example, on a majority voting scheme in which the cluster encoding ladder for the clusters to which the most new video samples are assigned is selected. The entire media presentation may then be encoded using the selected encoding ladder.

It should be noted that the techniques described herein are agnostic to specific codec implementation, and may be employed to configure encoders implemented according to any of a wide variety of video compression standards including, for example, Advanced Video Coding (AVC) or H.264, High Efficiency Video Coding (HEVC) or H.265, AV1, VP8, and VP9, as well as future standards, e.g., H.266. These techniques are also agnostic to the quality metric employed, being compatible with any of a variety of such metrics including, for example, PSNR, SSIM, VMAF, etc. The techniques described herein are also compatible with a wide variety of file formats and streaming technologies including, for example, Dynamic Adaptive Streaming over HTTP (DASH), HTTP Live Streaming (HLS), and Smooth Streaming It should further be appreciated that the disclosed techniques are compatible with both live and on demand applications, and are applicable to video, audio, and other forms of media content.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
receiving a plurality of video samples, each of the video samples being associated with one of a plurality of clusters based on an optimal rate-quality (RQ) curve associated with the video sample, each cluster of the plurality of clusters having a cluster encoding ladder associated therewith, the cluster encoding ladder for each cluster being based on a first optimal RQ curve for a first video sample associated with the cluster, the cluster encoding ladder for each cluster minimizing a sum of differences for the cluster, each difference in the sum of differences being between the optimal RQ curve for one of the other video samples associated with the cluster and a candidate RQ curve derived by encoding that video sample with the cluster encoding ladder;
for each video sample of the plurality of video samples, generating a feature set representing spatial and temporal complexity of the video sample;
training a classifier to associate the video samples with the clusters using the feature set;
for a first new video sample, generating a feature set representing spatial and temporal complexity of the first new video sample;
using the classifier, associating the first new video sample with a first cluster of the plurality of clusters based on the feature set for the first new video sample, the first new video sample being one of a plurality of new video samples of a media presentation;

selecting a cluster encoding ladder associated with the first cluster from among cluster encoding ladders associated with the plurality of clusters based on a majority voting scheme;

encoding the first new video sample using the cluster encoding ladder associated with the first cluster; and encoding all of the plurality of new video samples of the media presentation using the cluster encoding ladder associated with the first cluster.

2. The method of claim 1, wherein the classifier is a multi-class classifier.

3. The method of claim 1, wherein the cluster encoding ladder for each cluster corresponds to a centroid of that cluster.

4. The method of claim 1, wherein the feature set for each video sample includes statistical features generated from analysis of the video sample, and encoding features generated with a single-pass encoding of the video sample.

5. The method of claim 1, wherein the optimal rate-quality (RQ) curve for each of the video samples includes a standard definition (SD) portion and a high definition (HD) portion, and wherein each of the clusters includes only a subset of the SD portions or a subset of the HD portions.

6. The method of claim 1, further comprising:

using the classifier, associating each of the new video samples of the media presentation with one of the plurality of clusters based on feature sets for the new video samples thereby resulting in a set of clusters, the set of clusters including the first cluster and at least one other cluster of the plurality of clusters.

7. The method of claim 1, further comprising:

determining an optimal RQ curve for each of the video samples by encoding each of the video samples with a plurality of encoding profiles;

forming the clusters based on optimal RQ curves for the video samples; and for each cluster, (1) identifying a candidate encoding ladder for each video sample in the cluster based on a corresponding optimal RQ curve, (2) for each candidate encoder ladder and each of other video samples in the cluster, determining a difference between the optimal RQ curve for the other video sample and a candidate RQ curve obtained by encoding the other video sample using the candidate encoding ladder, (3) generating a sum of the differences for each candidate encoding ladder, and (4) selecting as the cluster encoding ladder one of candidate encoding ladders having the lowest sum of the differences.

8. The method of claim 7, wherein forming the clusters includes, for each cluster having fewer than a threshold number of the video samples associated therewith, associating the video samples associated with the cluster with a next-best cluster.

9. A system, comprising one or more processors and memory configured to:

receive a plurality of video samples, each of the video samples being associated with one of a plurality of clusters based on an optimal rate-quality (RQ) curve associated with the video sample, each cluster of the plurality of clusters having a cluster encoding ladder associated therewith, the cluster encoding ladder for each cluster being based on a first optimal RQ curve for a first video sample associated with the cluster, the cluster encoding ladder for each cluster minimizing a sum of differences for the cluster, each difference in the sum of differences being between the optimal RQ curve for one of the other video samples associated with the cluster and a candidate RQ curve derived by encoding that video sample with the cluster encoding ladder;

for each video sample of the plurality of video samples, generate a feature set representing spatial and temporal complexity of the video sample;

train a classifier to associate the video samples with the clusters using the feature set;

for a first new video sample, generate a feature set representing spatial and temporal complexity of the first new video sample;

using the classifier, associate the first new video sample with a first cluster of the plurality of clusters based on the feature set for the first new video sample, the first new video sample being one of a plurality of new video samples of a media presentation;

select a cluster encoding ladder associated with the first cluster from among the cluster encoding ladders associated with the plurality of clusters based on a majority voting scheme;

encode the first new video sample using the cluster encoding ladder associated with the first cluster; and encode all of the plurality of new video samples of the media presentation using the cluster encoding ladder associated with the first cluster.

10. The system of claim 9, wherein the classifier is a multi-class classifier.

11. The system of claim 9, wherein the cluster encoding ladder for each cluster corresponds to a centroid of that cluster.

12. The system of claim 9, wherein the feature set for each video sample includes statistical features generated from analysis of the video sample, and encoding features generated with a single-pass encoding of the video sample.

13. The system of claim 9, wherein the optimal rate-quality (RQ) curve for each of the video samples includes a standard definition (SD) portion and a high definition (HD) portion, and wherein each of the clusters includes only a subset of the SD portions or a subset of the HD portions.

14. The system of claim 9, wherein the one or more processors and memory are further configured to:

using the classifier, associate each of the new video samples of the media presentation with one of the plurality of clusters based on feature sets for the new video samples thereby resulting in a set of clusters, the set of clusters including the first cluster and at least one other cluster of the plurality of clusters.

15. The system of claim 9, wherein the one or more processors and memory are further configured to:

determine an optimal encoding ladder for each of the video samples by encoding each of the video samples with a plurality of encoding profiles;

form the clusters based on optimal encoding ladders for the video samples; and for each cluster, (1) identifying a candidate encoding ladder for each video sample in the cluster based on a corresponding optimal RQ curve, (2) for each candidate encoder ladder and each of other video samples in the cluster, determining a difference between the optimal RQ curve for the other video sample and a candidate RQ curve obtained by encoding the other video sample using the candidate encoding ladder, (3) generating a sum of the differences for each candidate encoding ladder, and (4) selecting as the cluster encoding ladder one of candidate encoding ladders having the lowest sum of the differences.

16. The system of claim 15, wherein the one or more processors and memory are configured to form the clusters by, for each cluster having fewer than a threshold number of the video samples associated therewith, associating the video samples associated with the cluster with a next-best cluster.

17. The method of claim 1, wherein the optimal RQ curve associated with the video sample and the first optimal RQ curve for the first video sample each comprise a metric of quality as a function of bitrate.

18. The method of claim 1, wherein:
an area under the optimal RQ curve corresponds to the optimal RQ curve associated with the video sample, and an area under the first optimal RQ curve corresponds to the first optimal RQ curve for the first video sample; and
the minimizing the sum of differences for the cluster comprises minimizing a sum of differences between the area under the optimal RQ curve and the area under the first optimal RQ curve.

19. The system of claim 9, wherein the optimal RQ curve associated with the video sample and the first optimal RQ curve for the first video sample each comprise a metric of quality as a function of bitrate.

20. The system of claim 9, wherein:
an area under the optimal RQ curve corresponds to the optimal RQ curve associated with the video sample, and an area under the first optimal RQ curve corresponds to the first optimal RQ curve for the first video sample; and
the minimizing the sum of differences for the cluster comprises minimizing a sum of differences between the area under the optimal RQ curve and the area under the first optimal RQ curve.

* * * * *